(12) United States Patent
Dong (10) Patent No.: US 10,655,850 B2
(45) Date of Patent: May 19, 2020

(54) AIR PURIFICATION APPARATUS FOR COAL-FIRED ELECTRIC POWER PLANT

(71) Applicant: Bing Ji Dong, Yangsan-si (KR)

(72) Inventor: Bing Ji Dong, Yangsan-si (KR)

( * ) Notice: Subject to any disclaimer, the term of this patent is extended or adjusted under 35 U.S.C. 154(b) by 139 days.

(21) Appl. No.: 15/866,956

(22) Filed: Jan. 10, 2018

(65) Prior Publication Data

US 2019/0078780 A1   Mar. 14, 2019

(30) Foreign Application Priority Data

Sep. 11, 2017   (KR) .................. 10-2017-0115608

(51) Int. Cl.
*B01D 53/14*   (2006.01)
*F23J 15/00*   (2006.01)
(Continued)

(52) U.S. Cl.
CPC .......... *F23J 15/04* (2013.01); *B01D 53/1475* (2013.01); *B01D 53/1493* (2013.01);
(Continued)

(58) Field of Classification Search
CPC .................................................. B01D 53/14; B01D 53/1475; B01D 53/1493; B01D 53/18; B01D 53/265; B01D 53/62; B01D 53/75; B01D 53/79; B01D 2251/304; B01D 2251/404; B01D 2251/604; B01D 2251/606; B01D 2257/502; B01D 2257/504; B01D 2258/0283; F01K 23/067; Y02A 50/2341; Y02A 50/2342; F23J 15/006; F23J 15/025; F23J 15/04; F23J 2215/40; F23J 2215/50;
(Continued)

(56) References Cited

U.S. PATENT DOCUMENTS 3,579,296 A * 5/1971 Cann ..................... B01D 53/501
                                                        423/243.02
4,979,966 A * 12/1990 Rojey ................ B01D 53/1456
                                                        95/174
(Continued)

FOREIGN PATENT DOCUMENTS

JP   2006-320879 A   11/2006
JP      5008507 B2    6/2012
(Continued)

*Primary Examiner* — Frank M Lawrence, Jr.
(74) *Attorney, Agent, or Firm* — Korus Patent, LLC; Seong Il Jeong (57) ABSTRACT

The present invention relates to an air purification apparatus for a coal-fired electric power plant, and more specifically to an air purification apparatus for a coal-fired electric power plant, which, first, can filter out wastes of contaminated smoke by using limewater, which, second, can filter out fine dust and carbon dioxide included in the smoke, which, third, can convert waste gas including carbon monoxide in a state in which only smoke remains into carbon dioxide by reacting oxygen with the waste gas and purify the smoke into clean air by allowing a sodium hydroxide solution to absorb the carbon dioxide, and which, fourth, can eliminate humidity from the clean air by passing the clean air through a moisture condenser a plurality of times and discharge clean air in a pure smoke state from the power plant.

4 Claims, 5 Drawing Sheets

(51) Int. Cl.
*F23J 15/04* (2006.01)
*B01D 53/79* (2006.01)
*B01D 53/75* (2006.01)
*B01D 53/62* (2006.01)
*F23J 15/02* (2006.01)
*B01D 53/18* (2006.01)
*F01K 23/06* (2006.01)
*B01D 53/26* (2006.01)

(52) U.S. Cl.
CPC ............ *B01D 53/18* (2013.01); *B01D 53/62* (2013.01); *B01D 53/75* (2013.01); *B01D 53/79* (2013.01); *F01K 23/067* (2013.01); *F23J 15/006* (2013.01); *F23J 15/025* (2013.01); *B01D 53/265* (2013.01); *B01D 2251/304* (2013.01); *B01D 2251/404* (2013.01); *B01D 2251/604* (2013.01); *B01D 2251/606* (2013.01); *B01D 2257/502* (2013.01); *B01D 2257/504* (2013.01); *B01D 2258/0283* (2013.01); *F23J 2215/40* (2013.01); *F23J 2215/50* (2013.01); *F23J 2217/10* (2013.01); *F23J 2217/50* (2013.01); *F23J 2219/40* (2013.01); *F23J 2219/70* (2013.01); *Y02A 50/2341* (2018.01); *Y02A 50/2342* (2018.01); *Y02C 10/04* (2013.01); *Y02C 10/06* (2013.01); *Y02E 20/326* (2013.01)

(58) Field of Classification Search
CPC .. F23J 2217/10; F23J 2217/50; F23J 2219/40; F23J 2219/70; Y02C 10/04; Y02C 10/06; Y02E 20/326
USPC .................................. 96/243, 267, 274, 277
See application file for complete search history.

(56) References Cited

U.S. PATENT DOCUMENTS

| | | | | |
|---|---|---|---|---|
| 5,078,759 | A * | 1/1992 | Kira | B01D 47/021 |
| | | | | 261/121.1 |
| 6,162,409 | A * | 12/2000 | Skelley | B01D 53/60 |
| | | | | 423/239.1 |
| 7,288,140 | B2 * | 10/2007 | Echizen | B01D 53/1406 |
| | | | | 261/98 |
| 8,313,564 | B2 * | 11/2012 | Kwack | B01D 46/0024 |
| | | | | 95/223 |
| 2003/0113239 | A1 * | 6/2003 | Pahlnnan | B01D 53/346 |
| | | | | 422/171 |
| 2008/0250715 | A1 * | 10/2008 | Cooper | B01D 47/06 |
| | | | | 48/197 FM |

FOREIGN PATENT DOCUMENTS

| | | |
|---|---|---|
| KR | 20-0200371 Y1 | 10/2000 |
| KR | 10-0883162 B1 | 2/2009 |
| KR | 10-2010-0110226 A | 10/2010 |

* cited by examiner

Prior Art

Fig. 5

AIR PURIFICATION APPARATUS FOR COAL-FIRED ELECTRIC POWER PLANT

BACKGROUND

1. Technical Field

The present invention relates to an air purification apparatus for a coal-fired electric power plant, which can purify smoke generated in a thermoelectric power plant which generates electricity by means of coal, and which can then discharge clean air from the power plant. More specifically, the present invention relates to an air purification apparatus for a coal-fired electric power plant, which, first, can filter out wastes of contaminated smoke by using limewater, which, second, can filter out fine dust and carbon dioxide included in the smoke, which, third, can convert waste gas including carbon monoxide in a state in which only smoke remains into carbon dioxide by reacting oxygen with the waste gas and purify the smoke into clean air by allowing a sodium hydroxide solution to absorb the carbon dioxide, and which, fourth, can eliminate humidity from the clean air by passing the clean air through a moisture condenser a plurality of times and discharge clean air in a pure smoke state from the power plant.

2. Description of the Related Art

A thermoelectric power plant is a station which generates steam by means of thermal power based on coal or petroleum, runs a turbine by means of the steam, and drives an electric generator, thereby generating electric power.

Figure 5:
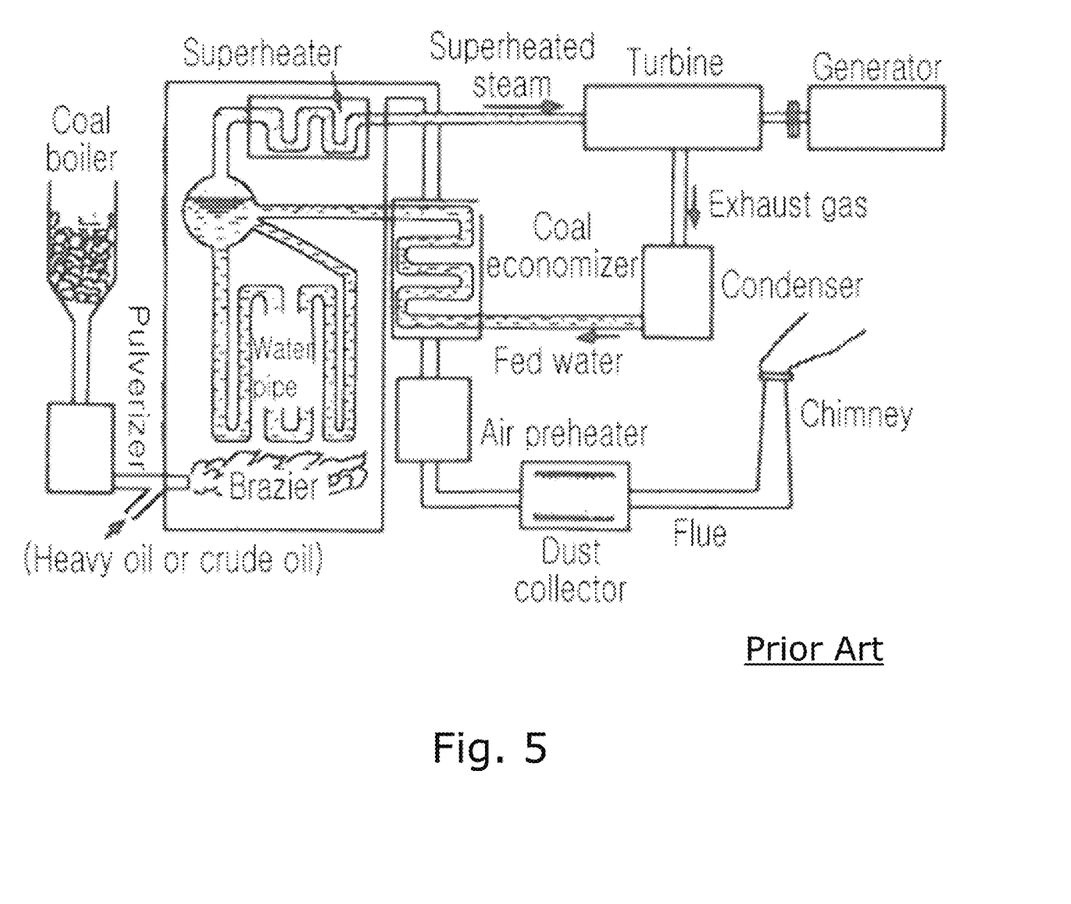
FIG. 5 is a diagram showing an implementation of a conventional thermoelectric power plant.

Such a thermoelectric power plant is implemented, as shown in FIG. 5. Recently, as environmental problems have emerged around the world, coal-fired thermal power plants are considered to be the main cause of environmental contamination.

In particular, in Korea, the Korean government has issued instructions to temporarily suspend and shut down some coal-fired electric power plants as emergency measures to reduce fine dust on Apr. 15, 2017.

However, the sudden stopping of coal-fired electric power plants which have functioned as power generation stations all over the world for a long period of time is expected to cause many problems, such as a reduction in jobs and the waste of professional knowledge, etc.

Furthermore, using coal-fired electric power plants, China produces 79% of total power, India produces 69% of total power, the U.S. produces 49% of total power, Germany produces 45% of total power, Japan produces 27% of total power, and Korea produces 40% of total power. In particular, coal-fired electric power plants account for 59% of PM 2.5 emissions in Korea.

That is, the shutting down of coal-fired electric power plants is measures which may hinder economic development. A solution to this problem is to process carbon dioxide and fine dust, i.e., the main causes of global warming, and to turn clean air to the nature.

In other words, by overcoming this problem, the use of coal-fired electric power plants can be resumed, and economic development can be accelerated, along with the preservation of the nature.

Accordingly, the applicant has sought measures to maintain the operation of coal-fired electric power plants and to purify exhaust gas generated through the operation, discharge clean air from the power plant, and to enable the discharged air to be incorporated into an environment.

More specifically, the applicant has been inspired by the fact that rain purifies the air in a natural environment.

Meanwhile, a technology for collecting coal ashes, i.e., the greatest contamination source of a coal-fired electric power plant, was developed. This is disclosed in Korean Patent No. 10-0596034 entitled "Apparatus for Collecting High-purity and Particulate Coal Ashes of Thermoelectric Power Plant."

This technology relates to an apparatus for collecting the high-purity and particulate refined ashes of a thermoelectric power plant, which has a low unburned carbon content and a high fineness, by means of a centrifugal process using differences between the grain sizes and specific gravities of the components of particulate material. More specifically, this technology relates to an apparatus for collecting the high-purity and particulate refined ashes of a thermoelectric power plant, which is applicable to purification facilities, etc. which can easily separate unburned carbon included in coal ashes, etc. generated in a thermoelectric power plant or the like.

However, this technology is not a technology which is capable of purifying exhaust gas generated in a thermoelectric power plant using coal.

Meanwhile, in connection with a technology capable of purifying exhaust gas (smoke, gas, etc.) generated in a power plant, a power plant exhaust gas purification apparatus and method and a plant cultivation method using the same, which utilize carbon dioxide in the exhaust gas of a power plant, is disclosed in Korean Patent No. 10-1725377.

This technology is characterized in that an absorbent liquid in which iron ions are dissolved is prepared, hydrogen peroxide is added to the absorbent liquid, sulfateions and nitrate ions are produced from sulfurous acid gas and nitrogen oxide included in the exhaust gas of a power plant by passing the exhaust gas of the power plant through the absorbent liquid, and the sulfateions and the nitrate ions are oxidized at normal temperature and pressure, are collected in the absorbent liquid by increasing solubility, are neutralized, and are eliminated. In the power plant exhaust gas purification apparatus for utilizing carbon dioxide of power plant exhaust gas, four columns divided by three plate membranes are formed inside a reactor, exhaust gas of a power plant is injected into the bottom of a first column, and the injected gas is raised in bubble forms along with a liquid catalyst inside the reactor. Accordingly, the raised liquid catalyst moves over the top end of the first plate membrane, falls down in a second column, moves to a third column through the lower side of the second plate membrane, rises, moves over the top end of a third plate membrane, falls down in a fourth column, and moves back to the first column through the lower end of the reactor. While the liquid catalyst is being circulated, sulfurous acid gas and nitrogen oxides of exhaust gas are collected and eliminated by the absorbent liquid of the liquid catalyst inside the reactor, and carbon dioxide is discharged and separated through a gas outlet at the top end of the reactor. As still another technology, a power plant exhaust gas purification apparatus and method and a plant cultivation method using the same, which utilize carbon dioxide in the exhaust gas of a power plant, is disclosed in Korean Patent No. 10-1757250.

A patent application for this technology was filed by the applicant of the second conventional technology, and is similar to the second conventional technology.

As yet another technology, Korean Patent No. 10-0817684 discloses a method of producing clean energy from coal.

This technology relates to a method which feeds coal into a reactor 10 sealed off from the atmosphere while injecting oxygen in order to burn part of coal to produce compressed hydrogen-rich raw gas and high-temperature pulverized fuel and moves the coal inside the reactor 10, thereby producing clean energy from the coal.

The hydrogen-rich gas is pyrolyzed in a pyrolysis compartment 21 to eliminate distilled material and hydrocarbon, and is desulfurized to produce synthetic gas.

Furthermore, the high-temperature pulverized fuel is gasified in an air blowing gasifier 11 to produce fuel gas and molten slag directed together from the gasifier to the outside through a common port 23. In this case, separated fuel gas is desulfurized to produce gas having very low NOX emission during burning.

However, it is determined that the above-described conventional technologies are different in an overall structure for purification and a purification method based on the overall structure from the present invention.

SUMMARY

An object of the present invention is to provide an air purification apparatus for a coal-fired electric power plant, which can purify smoke generated in a thermoelectric power plant which generates electricity by means of coal, and which can then discharge clean air from the power plant.

More specifically, an object of the present invention is to provide an air purification apparatus for a coal-fired electric power plant, which, first, can filter out wastes of contaminated smoke by using limewater, which, second, can filter out fine dust and carbon dioxide included in the smoke, which, third, can convert waste gas including carbon monoxide in a state in which only smoke remains into carbon dioxide by reacting oxygen with the waste gas and purify the smoke into clean air by allowing a sodium hydroxide solution to absorb the carbon dioxide, and which, fourth, can eliminate humidity from the clean air by passing the clean air through a moisture condenser a plurality of times and discharge clean air in a pure smoke state from the power plant.

According to an aspect of the present invention, there is provided an air purification apparatus for a coal-fired electric power plant, the apparatus including: a primary filter configured to filter out contaminants of contaminated smoke by means of limewater; a secondary filter configured to filter out fine dust and carbon dioxides included in the smoke; a tertiary filter configured to convert the waste gas secondarily filtered and including carbon monoxide into carbon dioxide by reacting oxygen with the waste gas, and to purify the waste gas into clean air by allowing a sodium hydroxide solution to absorb carbon dioxide; and a quaternary filter configured to eliminate humidity by passing the clean air through a moisture condenser a plurality of times, and to discharge clean air in a pure smoke state from a power plant.

The primary filter may be configured such that: a plurality of filtering spaces is formed; the plurality of filtering spaces are divided by first meshes through which contaminated air passes; a first smoke inlet configured to receive the contaminated air and a first smoke outlet configured to discharge the contaminated air after the contaminated air has passed through all the plurality of filtering spaces are provided; the bottoms of the plurality of filtering spaces are formed in "V" shapes; a spray pipe disposed over the filtering spaces and spray nozzles configured to connect with the spray pipe and to communicate with the filtering spaces, respectively, are included; a first water pump is provided at one end of the spray pipe, and a limewater tank is connected to the first water pump; transfer rollers are provided at the collection locations of the bottoms of the plurality of filtering spaces; hydraulic motors are each provided at one end of each of the transfer rollers, and a hydraulic unit is physically connected to and transfers power to the hydraulic motors; contaminants are separated from the air by limewater sprayed by the spray nozzles in the contaminated air having entered through the first smoke inlet and then fall down, and the air from which the contaminants have been separated is moved toward the first smoke outlet; and the contaminants separated from the air are transferred to a single location by the transfer rollers.

The secondary filter may be configured such that: a limewater filtration tank and a sodium bicarbonate and limewater filtration tank divided by a second mesh and a partition are included; the limewater filtration tank is provided with a second smoke inlet connected to the first smoke outlet; the sodium bicarbonate and limewater filtration tank is provided with a second smoke outlet configured to discharge the air; the bottoms of the limewater filtration tank and the sodium bicarbonate and limewater filtration tank are formed in "V" shapes, and first discharge plates are provided in the limewater filtration tank and second discharge plates are provided in the sodium bicarbonate and limewater filtration tank; one of the first discharge plates and one of the second discharge plates are disposed on the tops of the "V"-shaped bottoms of the limewater filtration tank and the sodium bicarbonate and limewater filtration tank, respectively; the other one of the first discharge plates and the other one of the second discharge plates are disposed in upper portions of the limewater filtration tank and the sodium bicarbonate and limewater filtration tank at a height which enables a temporary limewater tank and a temporary sodium bicarbonate and limewater filtration tank to be formed; a limewater tank and a sodium bicarbonate and limewater tank are connected to the bottoms of the limewater filtration tank and the sodium bicarbonate and limewater filtration tank, respectively; each of the limewater tank and the sodium bicarbonate and limewater tank is connected to a second water pump and a first pump; transfer belts are provided on the tanks, respectively, and transfer impurities, separated from the air in the secondary filter, from the tanks to an outside; in the secondary filter, limewater and sodium bicarbonate and limewater are respectively fed from the limewater tank and the sodium bicarbonate and limewater tank when the incoming air passes through the filtration tanks and are respectively collected in the temporary limewater tank and the temporary sodium bicarbonate and limewater tank, the collected limewater and the collected sodium bicarbonate and limewater each separate impurities included in the air while falling through a plurality of through holes formed in a corresponding one of the discharge plates, and the separated impurities, the limewater, and the sodium bicarbonate and limewater each enter a corresponding one of the limewater tank and the sodium bicarbonate and limewater tank; and the impurities are discharged by the transfer belts, and the limewater and the sodium bicarbonate and limewater are returned to the temporary limewater tank and the temporary sodium bicarbonate and limewater tank, respectively, through the second water pump and the first pump.

The tertiary filter may be configured such that: a primary filtration tank and a second filtration tank divided by a partition configured such that a through hole is formed on one side thereof are included; a third smoke inlet connected to the second smoke outlet is provided; a second spray pipe and a plurality of second spray nozzles connected to the second spray pipe are located over or on the primary filtration tank and the second filtration tank, and the second spray nozzles are each configured to communicate with one of the primary filtration tank and the second filtration tank; one end of the second spray pipe is connected to a third water pump and a second pump, and one side of the third water pump is connected to any one of the primary filtration tank and the second filtration tank; a sodium hydroxide solution is accommodated inside the primary filtration tank and the secondary filtration tank, and is circulated through the second spray pipe and sprayed via the second spray nozzles by the third water pump and the second pump; the air having entered through the third smoke inlet is transferred from the primary filtration tank to the secondary filtration tank via a smoke transfer tool, and is discharged through a third smoke outlet; the primary filtration tank is provided with an oxygen inlet configured to feed oxygen; and carbon monoxide included in the air having entered the tertiary filter is converted into carbon dioxide by reacting oxygen with the carbon monoxide, and the carbon dioxide is absorbed into the sodium hydroxide solution accommodated inside the primary filtration tank and the secondary filtration tank while passing through the primary filtration tank and the secondary filtration tank to thus allow clean air to be obtained.

The quaternary filter may be configured such that: a fourth smoke inlet configured to receive the clean air from the third smoke outlet of the tertiary filter and a fourth smoke outlet configured to completely discharge air on an opposite side are included; the bottom of the quaternary filter is formed in a "V" shape and connected to the waste water tank, and a third discharge plate is installed on the top of the "V"-shaped bottom of the quaternary filter; a plurality of moisture condensers extending from the third discharge plate to the top surface of the inside of the quaternary filter is disposed at predetermined intervals; the clean air having entered the quaternary filter is deprived of humidity while sequentially passing the moisture condensers, and clean air in a purified state is discharged through the fourth smoke outlet; and the moisture condensers move the humidity, of which the clean air has been deprived, in a downward direction and then drop the humidity toward the third discharge plate, and the dropped humidity falls further in the downward direction through a plurality of through holes formed through the third discharge plate and then stored in a waste water tank.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

The terms or words used in the present specification and the attached claims should not be interpreted as being limited to common or dictionary meanings, but should be interpreted as having meanings and concepts suitable for the technical spirit of the invention based on the principle that an inventor may appropriately define the concepts of terms in order to describe his or her invention in the best way.

Accordingly, the embodiments described in the present specification and the configurations shown in the drawings merely correspond to embodiments of the present invention and do not encompass the overall technical spirit of the present invention, with the result that it should be appreciated that there may be various equivalents that can replace the embodiments and the configurations at the time at which the present application is filed.

Prior to the following description given with reference to the accompanying drawings, it should be noted that items which are not required for the disclosure of the gist of the present invention, i.e., well-known configurations which may be readily added by a person having ordinary knowledge, will not be shown or described in detail.

The present invention relates to an air purification apparatus for a coal-fired electric power plant, which can purify smoke generated in a thermoelectric power plant which generates electricity by means of coal, and which can then discharge clean air from the power plant.

The present invention provides an air purification apparatus for a coal-fired electric power plant, which, first, can filter out wastes of contaminated smoke by using limewater, which, second, can filter out fine dust and carbon dioxide included in the smoke, which, third, can convert waste gas including carbon monoxide in a state in which only smoke remains into carbon dioxide by reacting oxygen with the waste gas and purify the smoke into clean air by allowing a sodium hydroxide solution to absorb the carbon dioxide, and which, fourth, can eliminate humidity from the clean air by passing the clean air through a moisture condenser a plurality of times and discharge the clean air in a pure smoke state from the power plant.

The present invention will be described in greater detail with reference to the accompanying drawings below.

Figure 1:
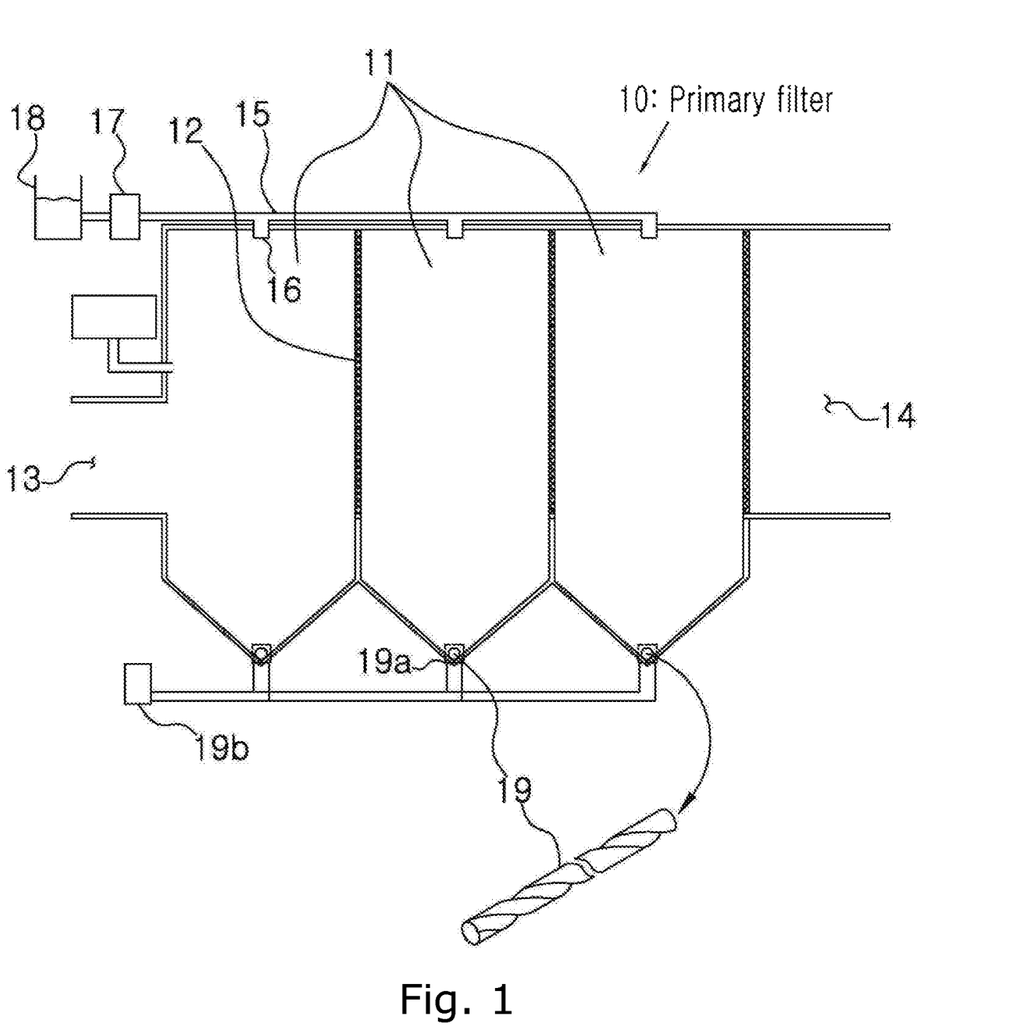
FIG. 1 is a diagram schematically showing the configuration of a primary filter in an air purification apparatus for a coal-fired electric power plant according to the present invention.
Figure 2:
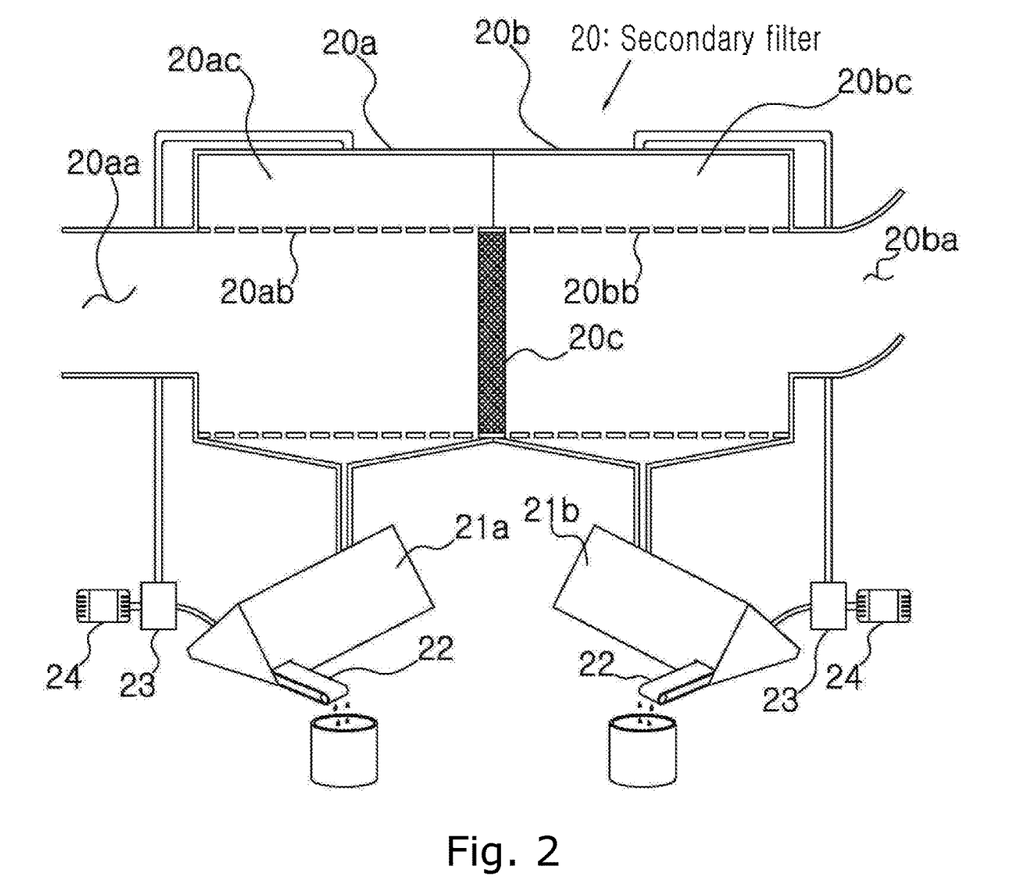
FIG. 2 is a diagram schematically showing the configuration of a secondary filter in the air purification apparatus for a coal-fired electric power plant according to the present invention.

FIG. 1 is a diagram schematically showing the configuration of a primary filter in an air purification apparatus for a coal-fired electric power plant according to the present invention, and FIG. 2 is a diagram schematically showing the configuration of a secondary filter in the air purification apparatus for a coal-fired electric power plant according to the present invention.

Figure 3:
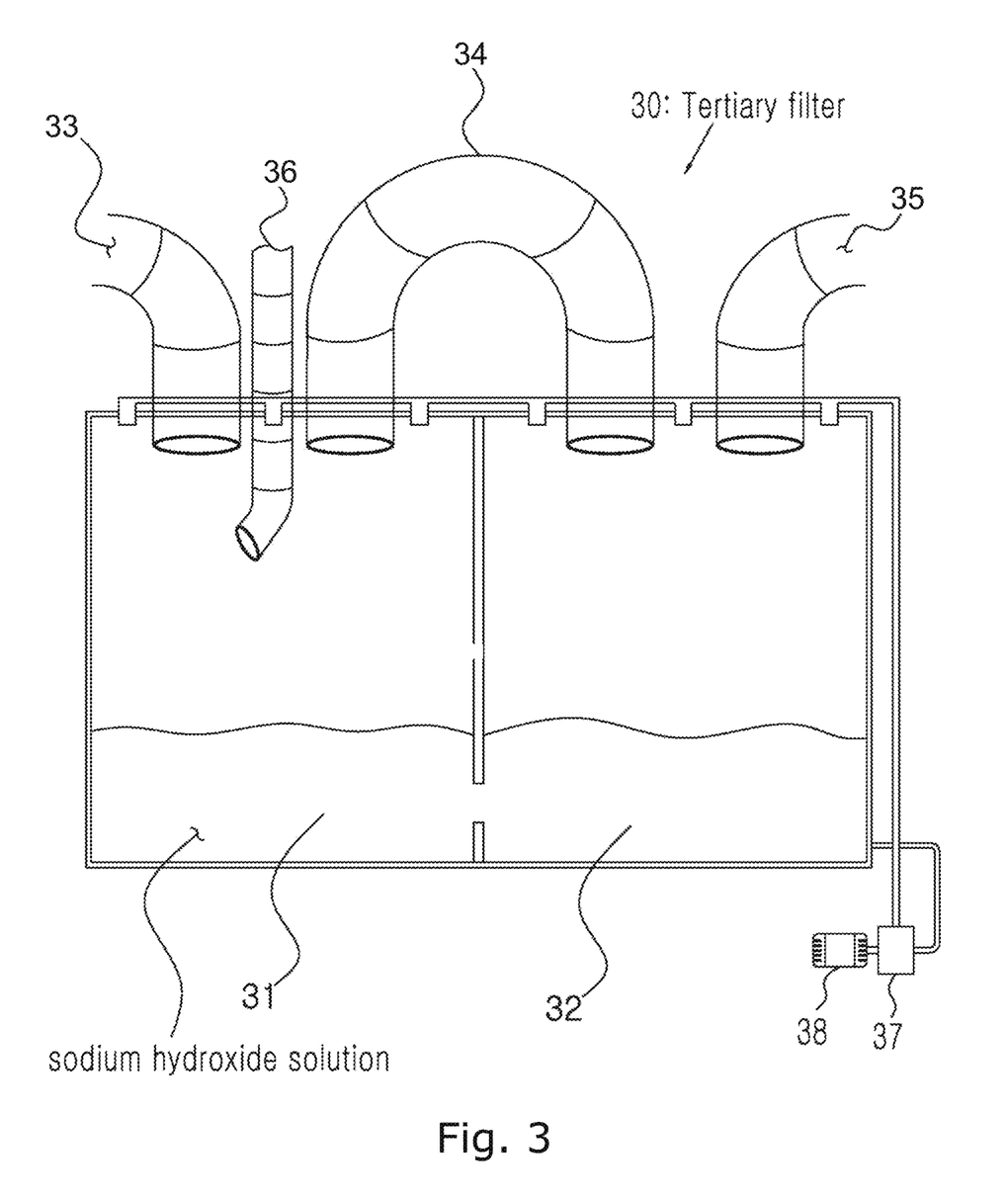
FIG. 3 is a diagram schematically showing the configuration of a tertiary filter in the air purification apparatus for a coal-fired electric power plant according to the present invention.
Figure 4:
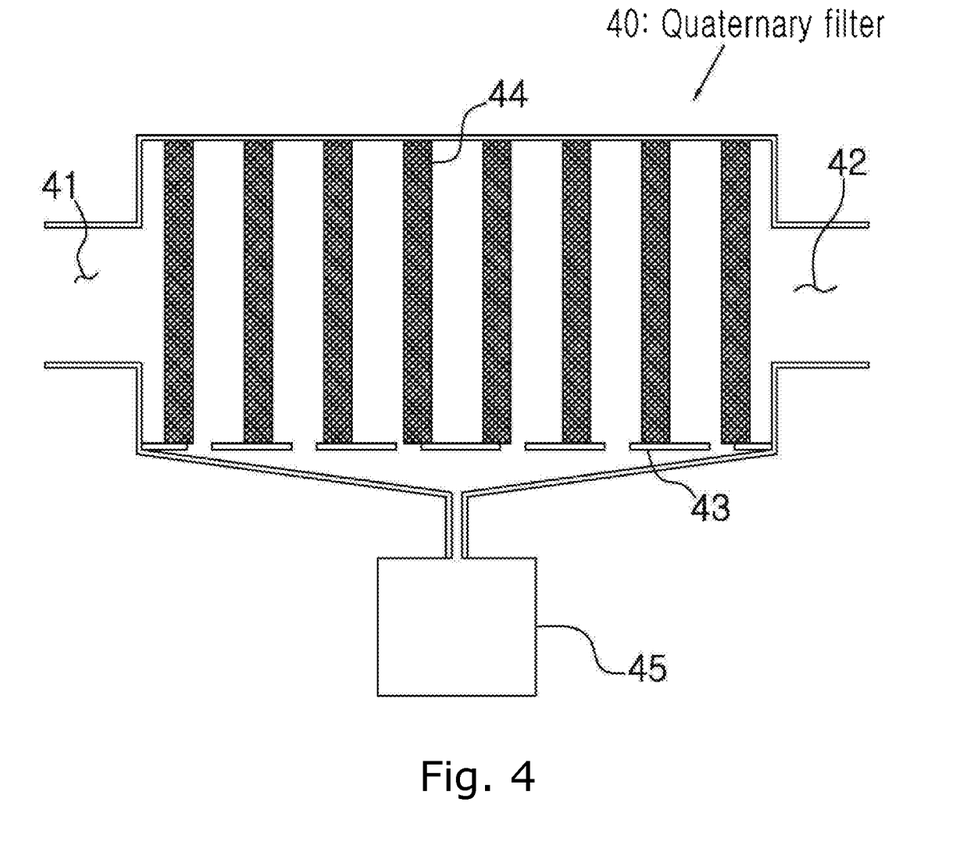
FIG. 4 is a diagram schematically showing the configuration of a quaternary filter in the air purification apparatus for a coal-fired electric power plant according to the present invention.

Furthermore, FIG. 3 is a diagram schematically showing the configuration of a tertiary filter in the air purification apparatus for a coal-fired electric power plant according to the present invention, and FIG. 4 is a diagram schematically showing the configuration of a quaternary filter in the air purification apparatus for a coal-fired electric power plant according to the present invention.

Contaminated air is purified while sequentially passing through the above-described filters 10 to 40. The primary filter 10 is described first, as follows:

As shown in FIG. 1, the primary filter 10 is provided with a plurality of filtering spaces 11, and the plurality of filtering spaces 11 is divided by first meshes 12.

In this case, contaminated air having entering the primary filter 10 passes through the first mesh 12, and some contaminants may be filtered out while the contaminated air is passing through the first mesh 12. Accordingly, the first mesh 12 is configured to have a size sufficient to filter out contaminants (for example, lime) which are generated in a power plant.

Furthermore, as the plurality of filtering spaces 11 is formed, the first meshes 12 may include a plurality of meshes. In this case, the mesh sizes of the first meshes 12 may be configured to decrease in a direction in which contaminated air is moved.

As described above, in the primary filter 10, a first smoke inlet 13 may be provided on one side of an inlet direction in order to allow contaminated air to enter the primary filter 10, whereas a first smoke outlet 14 may be provided in order to discharge the contaminated air after the contaminated air has passed through the plurality of filtering spaces 11.

Furthermore, the bottoms of the plurality of filtering spaces 11 may be formed in "V" shapes. The reason for this is to collect contaminants when the contaminants included in the contaminated air fall down to the bottom surfaces of the filtering spaces 11 as the weight of the contaminants is increased by limewater which is sprayed into the filtering spaces 11.

In this case, the limewater is sprayed into the filtering space 11 through a spray pipe 15 provided over the filtering spaces 11 and spray nozzles 16 configured to connect with the spray pipe 15 and communicate with the respective filtering spaces 11.

For this purpose, a first water pump 17 may be provided at one end of the spray pipe 15, and a limewater tank 18 may be connected to the first water pump 17.

Accordingly, limewater accommodated in the limewater tank 18 is moved along the spray pipe 15 through the driving of the first water pump 17.

Transfer rollers 19 may be provided at the locations of the bottom surfaces of the filtering spaces 11 where contaminants are collected. These transfer rollers 19 function to transfer contaminants so that the contaminants falling down to the bottom surfaces of the filtering spaces 11 are collected in a single direction of each of the filtering spaces 11.

A hydraulic motor may be coupled to one end of the transfer roller 19, and may receive power from a hydraulic unit 19b physically/electrically coupled to the hydraulic motor 19a and be operated by the power.

Meanwhile, although not designated by reference symbols, an air compressor and a compressed air impactor may be provided in the filtering space 11 adjacent to the first smoke inlet 13 in the primary filter 10.

The air compressor functions to suck and compress external air. The compressed air impactor functions to receive the compressed air from the air compressor and to discharge the compressed air to the filtering space 11, and forcibly discharges compressed air by generating great force.

Since the compression of air and the forcible discharge of compressing air are being widely used in other technical fields, detailed descriptions thereof will be omitted.

Referring to FIG. 2, the secondary filter 20 is provided with a second smoke inlet 20aa connected to the first smoke outlet 14 in order to receive air from which contaminants have been primarily filtered out by the primary filter.

More specifically, the secondary filter 20 includes a limewater filtration tank 20a and a sodium bicarbonate and limewater filtration tank 20b. The bottoms of the limewater filtration tank 20a and the sodium bicarbonate and limewater filtration tank 20b are also formed in "V" shapes.

The limewater filtration tank 20a includes first discharge plates 20ab, and the sodium bicarbonate and limewater filtration tank 20b includes second discharge plates 20bb.

One of the first discharge plates 20ab and one of the second discharge plates 20bb are disposed on the tops of the "V"-shaped bottoms of the limewater filtration tank 20a and the sodium bicarbonate and limewater filtration tank 20b, respectively, and the other one of the first discharge plates 20ab and the other one of the second discharge plates 20bb are formed in the upper portions of the limewater filtration tank 20a and the sodium bicarbonate and limewater filtration tank 20b, respectively, at a predetermined height.

Furthermore, the second smoke inlet 20aa has a height corresponding to that of the first discharge plates 20ab and the second discharge plates 20bb. The reason for this is that air having entered the second smoke inlet 20aa needs to pass between the air first discharge plates 20ab or second discharge plates 20bb installed in the top and bottom portions.

The limewater filtration tank 20a and the sodium bicarbonate and limewater filtration tank 20b are divided by a second mesh 20c disposed between the limewater filtration tank 20a and the sodium bicarbonate and limewater filtration tank 20b and a partition provided on the second mesh 20c. The second mesh 20c may be formed of a mesh in order to allow contaminated air to pass therethrough.

As the first discharge plates 20ab are installed in the limewater filtration tank 20a and the second discharge plates 20bb are installed in the sodium bicarbonate and limewater filtration tank 20b, a temporary limewater tank 20ac and a temporary sodium bicarbonate and limewater filtration tank 20bc may be provided in the limewater filtration tank 20a and the sodium bicarbonate and limewater filtration tank 20b. This will be described in detail below.

The bottom surfaces of the limewater filtration tank 20a and the sodium bicarbonate and limewater filtration tank 20b are connected to a limewater tank 21a and a sodium bicarbonate and limewater tank 21b, respectively.

The limewater tank 21a and the sodium bicarbonate and limewater tank 21b are tanks which store limewater, and sodium bicarbonate and limewater, respectively, and are each connected to a second water pump 23 and a first pump 24.

In this case, the second water pump 23 functions to suck a corresponding one of the limewater and the sodium bicarbonate and limewater respectively stored in the limewater tank 21a and sodium bicarbonate and limewater tank 21b, and the first pump 24 functions to move the corresponding one of the sucked limewater and the sodium bicarbonate and limewater toward a corresponding one of the limewater filtration tank 20a and the sodium bicarbonate and limewater filtration tank 20b.

For this purpose, as shown in FIG. 2, the second water pump 23 may be connected to the limewater filtration tank 20a or sodium bicarbonate and limewater filtration tank 20b through a conduit.

Meanwhile, the limewater tank 21a and the sodium bicarbonate and limewater tank 21b are each provided with a transfer belt 22. The transfer belt 22 may be formed of a conveyer belt using rollers or the like, and functions to transfer impurities (fine dust), etc., included in air passing through the secondary filter 20 and separated from the air during the passage, from the tank 21a or 21b to the outside.

In this case, it will be apparent that a component configured to ensure airtightness (packing rubber, or the like) may be provided in a space configured to allow the transfer belt 22 to be formed in each of the tanks 21a and 21b in order to prevent the limewater or sodium bicarbonate and limewater from leaking.

The operation of the secondary filter 20 is now described. When inflow air passes through the filtration tank 20a, limewater is fed from the limewater tank 21a and gathered in the temporary limewater tank 20ac, and the gathered limewater falls through a plurality of through holes formed in the first discharge plate 20ab and imparts weight to impurities included in air in the same manner as the primary filter 10, thereby separating impurities from the air.

In this case, in the secondary filter 20, the quantity of impurities is small because air has been filtered in the primary filter 10. Accordingly, the secondary filter 20 does not include a component configured to collect separated impurities on the bottom thereof.

This is the same when air passes through the sodium bicarbonate and limewater filtration tank 20b. The fallen limewater and the fallen sodium bicarbonate and limewater fall down to the tanks 21a and 21b, respectively, through a plurality of through holes formed in a corresponding one of the discharge plates 20ab and 20bb, and are continuously circulated.

Next, referring to FIG. 3, the tertiary filter 30 is provided with a third smoke inlet 33 which is connected to the second smoke outlet 20ba of the secondary filter 20.

The tertiary filter 30 is a space in which air is reduced into carbon dioxide by injecting oxygen into air from which contaminants have been eliminated, i.e., air including carbon monoxide in a gas state and the carbon dioxide is absorbed into a sodium hydroxide solution, thereby acquiring clean air.

More specifically, the tertiary filter 30 is divided into a primary filtration tank 31 and a secondary filtration tank 32. The primary filtration tank 31 and the secondary filtration tank 32 are divided by a partition. A through hole (not denoted by a reference symbol) is formed on one side of the lower portion of the partition.

Although not denoted by reference symbols, a second spray pipe and a plurality of second spray nozzles coupled to the second spray pipe are located over or on the primary filtration tank 31 and the secondary filtration tank 32, the second spray nozzles are configured to communicate with the primary filtration tank 31 and the secondary filtration tank 32.

Furthermore, one end of the second spray pipe is connected to a third water pump 37 and a second pump 38. One side of the third water pump 37 is configured to be connected to any one of the primary filtration tank 31 and the secondary filtration tank 32.

A sodium hydroxide solution may be accommodated inside the primary filtration tank 31 and the secondary filtration tank 32.

Furthermore, an oxygen inlet 36 may communicate with any one of the primary filtration tank 31 and the secondary filtration tank 32. The oxygen inlet 36 functions to introduce oxygen into any one of the primary filtration tank 31 and the secondary filtration tank 32.

Accordingly, air (waste gas) including carbon monoxide introduced into the primary filtration tank 31 through the third smoke inlet 33 is reduced into carbon dioxide through reaction with oxygen introduced through the oxygen inlet 36 ($CO+O=CO_2$).

In this case, the sodium hydroxide solution accommodated inside the primary filtration tank 31 and the secondary filtration tank 32 absorb carbon dioxide, thereby allowing only clean air to remain.

Furthermore, in order to allow the sodium hydroxide solution to easily absorb carbon dioxide, the sodium hydroxide solution may be circulated by the third water pump 37 and the second pump 38 through the second spray pipe and the second spray nozzles, and may be allowed to fall from the above.

In this case, as the through hole is formed on one side of the lower portion of the partition configured to divide the primary filtration tank 31 and the secondary filtration tank from each other, the sodium hydroxide solution may be shared between the primary filtration tank 31 and the secondary filtration tank 32.

Furthermore, the above-described absorption of carbon dioxide is performed while air introduced through the third smoke inlet 33 is passing through the primary filtration tank 31 and the secondary filtration tank 32. This is enabled by a smoke transfer tool 34 configured to connect the primary filtration tank 31 and the secondary filtration tank 32 with each other.

Clean air acquired through the tertiary filter 30 as described above is moved to the fourth smoke inlet 41 of a quaternary filter 40, connected to a third smoke outlet 35, through the third smoke outlet 35, thereby allowing the clean air to pass through the quaternary filter 40.

Referring to FIG. 4, the quaternary filter 40 includes a fourth smoke inlet 41 configured to receive clean air from the tertiary filter 30 and a fourth smoke outlet 42 configured to completely discharge air to the opposite side.

Furthermore, the bottom of the quaternary filter 40 is formed in a "V" shape, and is connected to a waste water tank through a conduit. A third discharge plate 43 may be installed on the top of the "V"-shaped bottom. In this case, a plurality of through holes is also formed through the third discharge plate 43.

Furthermore, a plurality of moisture condensers 44 each extending from the third discharge plate 43 to the top surface of the inside of the quaternary filter 40 may be arranged at predetermined intervals.

Accordingly, the clean air introduced through the fourth smoke inlet 41 may be deprived of humidity while sequentially passing through the moisture condensers 44, and may be discharged through the fourth smoke outlet 42 in a purified state.

Moreover, the moisture condensers 44 move the humidity, of which the clean air has been deprived, in a downward direction and drop the humidity down to the third discharge plate 43, and the dropped humidity falls further in the downward direction through the plurality of through holes formed through the third discharge plate 43 and is finally stored in the waste water tank 45.

According to the present invention, there is provided the air purification apparatus for a coal-fired electric power plant, which can purify smoke generated in a thermoelectric power plant which generates electricity by means of coal, and which can then discharge clean air from the power plant.

More specifically, according to the present invention, there is provided the air purification apparatus for a coal-fired electric power plant, which, first, can filter out wastes of contaminated smoke by using limewater, which, second, can filter out fine dust and carbon dioxide included in the smoke, which, third, can convert waste gas including carbon monoxide in a state in which only smoke remains into carbon dioxide by reacting oxygen with the waste gas and purify the smoke into clean air by allowing a sodium hydroxide solution to absorb the carbon dioxide, and which, fourth, can eliminate humidity from the clean air by passing the clean air through a moisture condenser a plurality of times and discharge clean air in a pure smoke state from the power plant.

The foregoing description gives a description of the exemplary configurations of the present invention. Since various types of design may be made without departing from the technical spirit of the present invention. It will be apparent to those skilled in the art that the present invention is not limited to the configurations shown in the accompanying drawings.

What is claimed is:

1. An air purification apparatus for a coal-fired electric power plant, the apparatus comprising:
   a primary filter configured to filter out contaminants of contaminated smoke by means of limewater;
   a secondary filter configured to filter out fine dust and carbon dioxides included in the smoke;
   a tertiary filter configured to convert the waste gas secondarily filtered and including carbon monoxide into carbon dioxide by reacting oxygen with the waste gas, and to purify the waste gas into clean air by allowing a sodium hydroxide solution to absorb carbon dioxide; and
   a quaternary filter configured to eliminate humidity by passing the clean air through a moisture condenser a plurality of times, and to discharge clean air in a pure smoke state from a power plant,
   wherein the primary filter is configured such that:
   a plurality of filtering spaces is formed;
   the plurality of filtering spaces are divided by first meshes through which contaminated air passes;
   a first smoke inlet configured to receive the contaminated air and a first smoke outlet configured to discharge the contaminated air after the contaminated air has passed through all the plurality of filtering spaces are provided;
   bottoms of the plurality of filtering spaces are formed in "V" shapes;
   a spray pipe disposed over the filtering spaces and spray nozzles configured to connect with the spray pipe and to communicate with the filtering spaces, respectively, are included;
   a first water pump is provided at one end of the spray pipe, and a limewater tank is connected to the first water pump;
   transfer rollers are provided at collection locations of the bottoms of the plurality of filtering spaces;
   hydraulic motors are each provided at one end of each of the transfer rollers, and a hydraulic unit is physically connected to and transfers power to the hydraulic motors;
   contaminants are separated from the air by limewater sprayed by the spray nozzles in the contaminated air having entered through the first smoke inlet and then fall down, and the air from which the contaminants have been separated is moved toward the first smoke outlet; and
   the contaminants separated from the air are transferred to a single location by the transfer rollers.

2. The air purification apparatus of claim 1, wherein the secondary filter is configured such that:
   a limewater filtration tank and a sodium bicarbonate and limewater filtration tank divided by a second mesh and a partition are included;
   the limewater filtration tank is provided with a second smoke inlet connected to the first smoke outlet;
   the sodium bicarbonate and limewater filtration tank is provided with a second smoke outlet configured to discharge the air;
   bottoms of the limewater filtration tank and the sodium bicarbonate and limewater filtration tank are formed in "V" shapes, and first discharge plates are provided in the limewater filtration tank and second discharge plates are provided in the sodium bicarbonate and limewater filtration tank;
   one of the first discharge plates and one of the second discharge plates are disposed on tops of the "V"-shaped bottoms of the limewater filtration tank and the sodium bicarbonate and limewater filtration tank, respectively;
   a remaining one of the first discharge plates and a remaining one of the second discharge plates are disposed in upper portions of the limewater filtration tank and the sodium bicarbonate and limewater filtration tank at a height which enables a temporary limewater tank and a temporary sodium bicarbonate and limewater filtration tank to be formed;
   a limewater tank and a sodium bicarbonate and limewater tank are connected to the bottoms of the limewater filtration tank and the sodium bicarbonate and limewater filtration tank, respectively;
   each of the limewater tank and the sodium bicarbonate and limewater tank is connected to a second water pump and a first pump;
   transfer belts are provided on the tanks, respectively, and transfer impurities, separated from the air in the secondary filter, from the tanks to an outside;
   in the secondary filter, limewater and sodium bicarbonate and limewater are respectively fed from the limewater tank and the sodium bicarbonate and limewater tank when the incoming air passes through the filtration tanks and are respectively collected in the temporary limewater tank and the temporary sodium bicarbonate and limewater tank, the collected limewater and the collected sodium bicarbonate and limewater each separate impurities included in the air while falling through a plurality of through holes formed in a corresponding one of the discharge plates, and the separated impurities, the limewater, and the sodium bicarbonate and limewater each enter a corresponding one of the limewater tank and the sodium bicarbonate and limewater tank; and
   the impurities are discharged by the transfer belts, and the limewater and the sodium bicarbonate and limewater are returned to the temporary limewater tank and the temporary sodium bicarbonate and limewater tank, respectively, through the second water pump and the first pump.

3. The air purification apparatus of claim 2, wherein the tertiary filter is configured such that:
   a primary filtration tank and a second filtration tank divided by a partition configured such that a through hole is formed on one side thereof are included;
   a third smoke inlet connected to the second smoke outlet is provided;
   a second spray pipe and a plurality of second spray nozzles connected to the second spray pipe are located over or on the primary filtration tank and the second filtration tank, and the second spray nozzles are each configured to communicate with one of the primary filtration tank and the second filtration tank;
   one end of the second spray pipe is connected to a third water pump and a second pump, and one side of the third water pump is connected to any one of the primary filtration tank and the second filtration tank;

a sodium hydroxide solution is accommodated inside the primary filtration tank and the secondary filtration tank, and is circulated through the second spray pipe and sprayed via the second spray nozzles by the third water pump and the second pump;

the air having entered through the third smoke inlet is transferred from the primary filtration tank to the secondary filtration tank via a smoke transfer tool, and is discharged through a third smoke outlet;

the primary filtration tank is provided with an oxygen inlet configured to feed oxygen; and carbon monoxide included in the air having entered the tertiary filter is converted into carbon dioxide by reacting oxygen with the carbon monoxide, and the carbon dioxide is absorbed into the sodium hydroxide solution accommodated inside the primary filtration tank and the secondary filtration tank while passing through the primary filtration tank and the secondary filtration tank to thus allow clean air to be obtained.

4. The air purification apparatus of claim 3, wherein the quaternary filter is configured such that:

a fourth smoke inlet configured to receive the clean air from the third smoke outlet of the tertiary filter and a fourth smoke outlet configured to completely discharge air on an opposite side are included;

a bottom of the quaternary filter is formed in a "V" shape and connected to a waste water tank, and a third discharge plate is installed on a top of the "V"-shaped bottom of the quaternary filter;

a plurality of moisture condensers extending from the third discharge plate to a top surface of an inside of the quaternary filter is disposed at predetermined intervals;

the clean air having entered the quaternary filter is deprived of humidity while sequentially passing the moisture condensers, and clean air in a purified state is discharged through the fourth smoke outlet; and the moisture condensers move the humidity, of which the clean air has been deprived, in a downward direction and then drop the humidity toward the third discharge plate, and the dropped humidity falls further in the downward direction through a plurality of through holes formed through the third discharge plate and then stored in the waste water tank.

\* \* \* \* \*